R. W. MOORE.
PROCESS OF MAKING SILICON TETRACHLORID.
APPLICATION FILED FEB. 18, 1918.
1,350,932.
Patented Aug. 24, 1920.
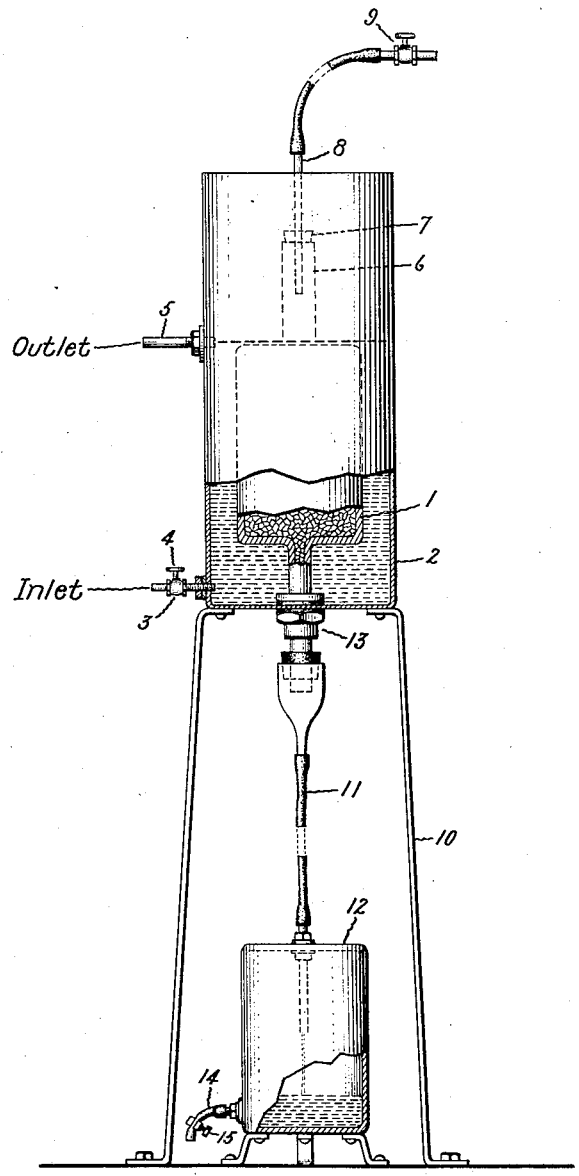
Inventor:
Roy W. Moore,
by
His Attorney

UNITED STATES PATENT OFFICE.

ROY W. MOORE, OF SCHENECTADY, NEW YORK, ASSIGNOR TO GENERAL ELECTRIC COMPANY, A CORPORATION OF NEW YORK.

PROCESS OF MAKING SILICON TETRACHLORID.

1,350,932.  Specification of Letters Patent.  Patented Aug. 24, 1920.

Application filed February 18, 1918. Serial No. 217,740.

*To all whom it may concern:*

Be it known that I, ROY W. MOORE, a citizen of the United States, residing at Schenectady, county of Schenectady, State of New York, have invented certain new and useful Improvements in Processes of Making Silicon Tetrachlorid, of which the following is a specification.

The present invention relates to the control of exothermic chemical reactions between substances on a scale large enough to cause sufficient rise of temperature in the reaction mass to yield undesired reaction products unless the formation of such products is guarded against.

My invention is particularly applicable to the efficient production of fluid reaction products, such, for example, as halogen compounds of silicon, boron, titanium, and the like, by combination of the respective metalloid, or of a compound, for example the carbid, with a halogen such as chlorin or bromin. For example, when silicon tetrachlorid is made by conducting chlorin gas into contact with heated silicon and the amounts of silicon and chlorin are sufficiently great, the colorless silicon tetrachlorid becomes contaminated with a brownish yellow solid compound, which appears to be a subchlorid of silicon. This compound, or compounds, not only reduces the yield but plugs the outlet tubes for delivering the tetrachlorid. Restricting the reaction by reducing the flow of chlorin gas is undesirable as the rate of production of the tetrachlorid is thereby reduced.

I have discovered that the reaction may be carried out unimpeded with an unrestricted yield by controllably withdrawing heat from the reaction zone to prevent the formation of the undesired compound or compounds.

The novel features of my invention are pointed out with greater particularity in the appended claims, and for a better understanding of my invention reference may be had to the accompanying description taken in connection with the accompanying drawing which shows a side elevation with parts partly broken away of a simple apparatus for carrying out my invention.

Referring to the drawing the charge of silicon, silicon carbid, titanium carbid, or other material which is to take part in the reaction with the halogen is placed in the comminuted state in a container 1 which may consist of copper, or other suitable metal. The container 1 is located within a tank 2 containing a cooling fluid, preferably water, introduced by an inlet tube 3 having a valve 4 and an outlet tube 5. The reaction chamber has a charging throat 6 projecting above the water level closed by means of a stopper 7, through which passes the tube 8 for introducing the halogen. This tube 8 is connected to a suitable source of supply. A valve 9 serves to regulate the flow of gas through the gas-conveying tube. The apparatus may be supported by pedestal 10 and communicates through a tube 11 with a tank 12 for receiving the silicon chlorid, or other reaction product. Any suitable form of coupling 13 may be provided for connecting the reaction chamber with the tube 11. Silicon tetrachlorid is preferably drained by means of a rubber tube 14 closed with a pinch cock 15 as an ordinary metal cock is apt to be plugged up by silicon dioxid which is formed when silicon tetrachlorid comes into contact with the moisture of the atmosphere.

The reaction may be started when the apparatus has been suitably charged with silicon, silicon carbid, or the like, by heating some of this material externally in a crucible and then introducing it into the reaction chamber on top of the charge and immediately starting the stream of chlorin, or the like. An exothermic reaction takes place which heats the rest of the charge whereupon the stream of chlorin gas is suitably regulated by means of the valve 9 to have the reaction take place at the desired rate. The rate of reaction may be rapid enough to furnish a continuous stream of liquid silicon tetrachlorid or other reaction product into the tank 12 without danger of the metal container 1 being attacked chemically or that a brownish, yellow subchlorid will be formed. In the case of the reaction between chlorin and titanium carbid to form titanium tetrachlorid, an undesired reddish brown compound is formed in case the reaction temperature is allowed to become too high. If heat is not removed by a cooling medium, the reaction is likely to "run away" with the accompanying production of undesired reaction products.

Preferably the container 12 consists of glass so that the stream of material coming from the tube 11 may be observed and if it is noticed that there is a little solid product coming through from the chamber 1, the circulation of the cooling water may be increased somewhat or the temperature of the cooling water lowered, or both, in order to more vigorously cool the reaction chamber. Ordinarily it will not be necessary to restrict the inflow of the chlorin, or other halogen through the tube 8 into the reaction chamber. The effect of the cooling in the control of the present reaction therefore very materially increases the efficiency at which the apparatus may be operated and increases the rate at which the desired halogen product may be formed without forming an undesired solid sub-halogen product.

While I have made claim particularly to a process of making silicon tetrachlorid from a charge containing silicon as a constituent, that is, a charge either of silicon or a compound of silicon, such a silicon carbid, I intend by these claims to also cover the process of making compounds of other elements, such as titanium, which form more than one halogen compound and which would form mixtures of halogen compounds unless the reaction temperature were controlled.

What I claim as new and desire to secure by Letters Patent of the United States, is,—

1. A step in the process of carrying out a reaction between a halogen and a charge containing silicon as a constituent, which consists in controllably withdrawing heat from the reaction zone to maintain the reaction temperature within the range in which a desired silicon compound is formed, and below the point at which undesired halogen compounds of silicon are formed.

2. The process of making silicon tetrachlorid by combination between silicon and chlorin in quantities sufficiently great to produce undesired reactions products which consists in circulating a cooling medium within thermal relation of the reaction zone to maintain the temperature of the reaction mass below the temperature of formation of some undesired products.

3. The process of making silicon tetrachlorid which consists in bringing chlorin gas into contact with silicon in unrestricted quantities and in withdrawing heat from the reaction mass at a rate sufficient to prevent a rise of temperature to a point at which a brownish yellow solid reaction product is formed.

In witness whereof, I have hereunto set my hand this 15th day of February, 1918.

ROY W. MOORE.